Nov. 28, 1961 I. I. KASTEL 3,011,024

TELEPHONE SET

Filed July 25, 1958

INVENTOR.
ISIDOR I. KASTEL
BY William F. Nickel
ATTORNEY

United States Patent Office 3,011,024
Patented Nov. 28, 1961

3,011,024

TELEPHONE SET

Isidor I. Kastel, 222 E. 17th St., Brooklyn 26, N.Y.; Lillian Kastel, administratrix of said Isidor I. Kastel, deceased Filed July 25, 1958, Ser. No. 750,926
1 Claim. (Cl. 179—1)

My invention is an improved telephone set through which messages are sent and received, designed so that the telephone set can be used in a much more advantageous manner.

An important object of the invention is to provide a telephone set of the type to be placed on a desk or other support at home or in office, and so constructed that reception and transmission can be had more conveniently, without necessitating any extensive change in the design of an ordinary telephone set, or any great modification of the structure thereof.

In its preferred form, the invention comprises a casing with an exposed dial, so that the number of a call can easily be signalled; and having parts within it so arranged that, when a call is heard, it can be received through receiving and transmitting members inside the casing, and made audible to anyone within a range of several feet from the set, and a message transmitted through the set from a similar point. Hence a person receiving or taking a call need not be very close to the set, and does not have to lift the ordinary member having receiving and transmitting portions at its ends, which is part of every telephone set of the present conventional type; and the hands are thus left free for other purposes while the set is in use.

A further object of the invention is to provide a telephone set which can be handled in the fashion above outlined, and which incorporates amplifying devices, so that a message may be heard at some distance from the set, and readily answered in the same way.

Another object is to provide a telephone set which has the construction above outlined; and which includes the usual member with mouthpiece and ear piece thereon, to be lifted in the regular way if the inside transmitting and receiving parts are for any reason not to be utilized. Thus a private conversation in low tones whenever desired.

Other objects and the advantages of the invention are fully outlined in the ensuing description, and an embodiment of the improvement is illustrated in the drawings. The novel features are defined in the claim, but this disclosure, however, is explanatory only, and various changes may be made in minor respects without departing from the general principle in which the invention resides or deviating from the general plan of construction which characterizes the improvement.

Figures 1, 2, 3, 4, 5, 6, 7, 8, 9, 10:
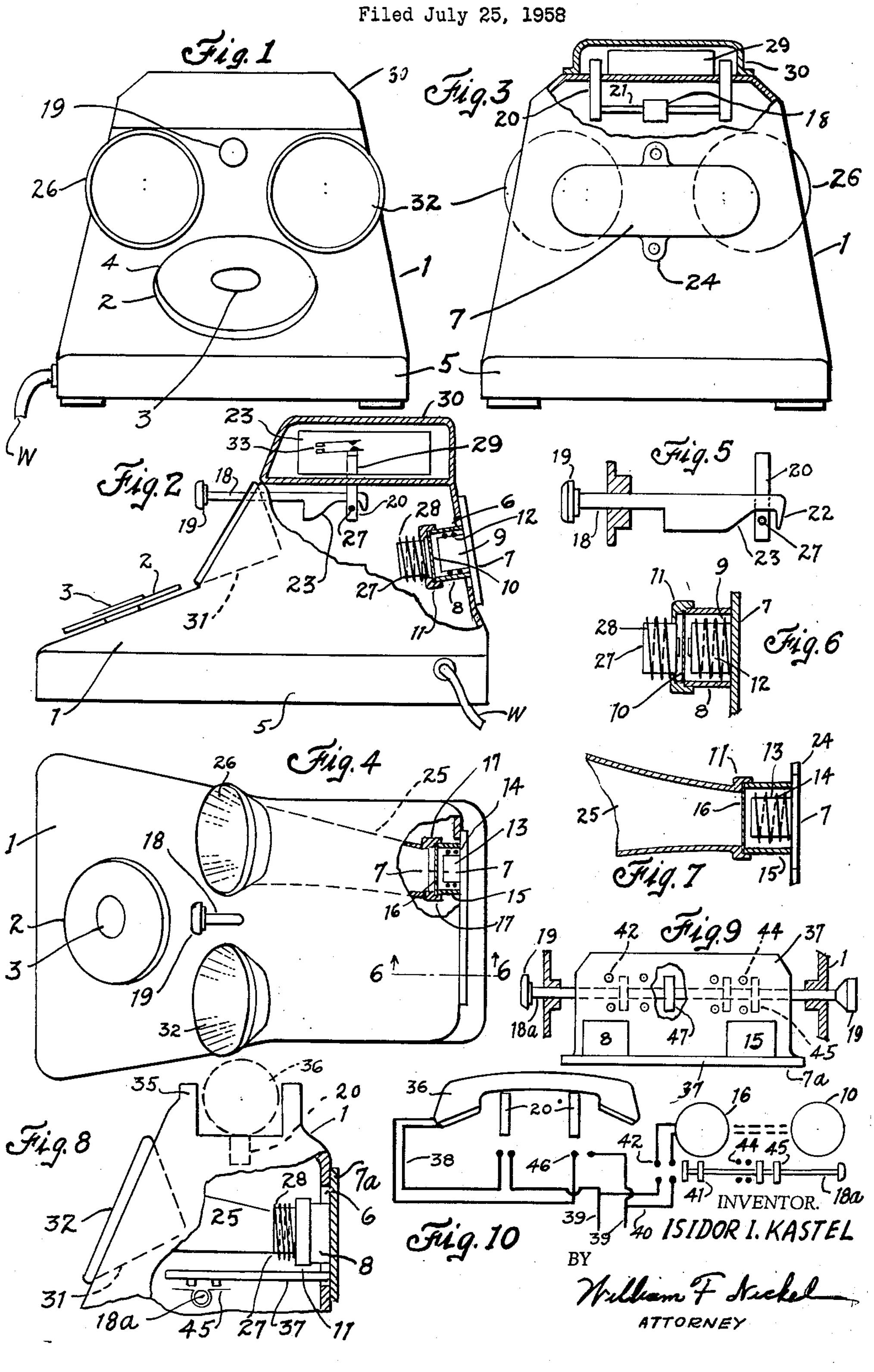
FIGURE 1 is a front view of a telephone set showing my improvement.
FIGURE 2 is a side view thereof; partly in section.
FIGURE 3 is a rear view.
FIGURE 4 is a top view.
FIGURE 5 shows a detail of the controlling switch element.
FIGURE 6 is a section along line 6—6 of FIGURE 4.
FIGURE 7 is a similar section on line 7—7 of FIGURE 4.
FIGURE 8 shows the top of a set of modified design.
FIGURE 9 is a view of switch mechanism therefor.
FIGURE 10 is a diagram of the circuits for said modification.

The improvement portrayed in FIGURES 1 to 7 inclusive comprises a housing 1 adjacent the front end of which is a dial 2 mounted on a pivot 3. This dial is shown in outline only and it bears the usual indications, such as letters and numbers on the rim 4 thereof, so that it can be manipulated according to the exchange and number which the operator desires to call.

The device is widest and longest at the base 5 and carries within it at the lower part thereof adjacent the base the usual electrical accessories which are mounted in the base of an ordinary telephone set to facilitate the operation. Above the base, the rear wall of the housing has an opening 6 which is covered by a panel 7 bearing the receiving and transmitting diaphragms of the telephone and the magnets cooperating with these diaphragms.

The inner face of this panel as indicated in FIGURES 6, 7 and 9, carries at one end a hollow boss or projection 8 in which is a magnet 9 made fast to the panel; and the front of this hollow projection is closed by a diaphragm 10, secured against the rim of the projection 8 by ring 11 having an inside shoulder which abuts the rim of the diaphragm, and the rim of the ring 11 overlaps and encircles the projection 8 and is secured thereto in any suitable manner to hold the diaphragm 10 in place. The magnet core 9 carries coils of wire 12 and when impulses of current are passed through the coils 12, the diaphragm is vibrated in the usual way.

The opposite end of the panel carries another magnet core 13 bearing turns or coils of wire 14 in a hollow projection or boss 15 affixed to the panel. A metallic diaphragm 16 is secured against the end of the projection 15 in proximity to the magnet core 13 and this diaphragm is held in place by a ring 17, similar to the ring 11, with a central opening so as to expose the diaphragm 16 over the greater part of its surface. The turns of wire 14 are connected in the usual circuit so that when a person speaks into the 'phone, the diaphragm 16 responds to the sound waves of the operator's voice and vibrates towards and from the magnet 13.

The coils of wire on the magnets 9 and 13 are connected in the circuit in the usual way for receiving and transmitting and the outside wire to the telephone set is indicated at W leading into the base 5. On the interior are the well-known connections to the coils 12 and 14. The complete connections are not shown as they are not part of this invention. The bosses 8 and 15 and the rings 11 should, of course, be of insulating material.

The upper part of the telephone housing 1 has a bar 18 projecting out in front and bearing head or knob 19. This bar controls the studs 20 which in the ordinary telephone desk set project upward out of the housing and are depressed by the hand set of the 'phone which carries the transmitting and receiving members. At the lower ends of these studs 20 are switching parts which are kept open when the studs are depressed by the weight of the hand set, but when the hand set is lifted the studs are pressed upward and the switch is closed to put the 'phone set in circuit. The switch parts are well known and need not be illustrated herein. The bar 18 has a hooked end 22 which extends over a cross link 21 joined rigidly to both studs 20 and carries on its lower face a cam portion 23. When the movable member 18 is pressed inward the cam portion 23 acts on the link 21 and depresses both studs so that the circuit is open. When the bar is pulled outward, the cam portion 23 releases the link 21 so that the studs 20 can move upward and the main circuit is thus closed. The panel 7 bearing the receiving and transmission members of the set is secured against the back of the housing 1 by screws passing through perforated lugs or projections 24 or in any other suitable manner.

Within the housing 1 is a tubular horn-shaped member 25, the inner end of which abuts the ring 17, and the outer end of which has a form of an open mouthpiece 26 at the front of the housing 1 to one side thereof. Obviously, when a person speaks into this mouthpiece 26, his voice will cause the diaphragm 16 to vibrate even though he is several feet from the housing 1. The member 25 may be secured at its inner end to the ring 17 and an opening is provided in the housing 1 so that the member can be suitably seated therein and engage the ring 17 at its inner end.

The ring 11 has mounted therein another magnetic core 27 in operative relation to the diaphragm 10, and the coils 28 thereon are connected by wiring to an amplifier unit, indicated diagrammatically at 29, at the top of the housing between the studs 20. This unit may be covered by a cap 30 and the amplifier set is connected by wiring to a loud speaker 31 adjacent an opening 32 beside the mouthpiece 26. On the side of the casing for the amplifier set is switching mechanism 33 above one of the studs 20. With this arrangement whenever the knob 19 is pulled to draw the stem 18 out partway, both the circuit to the coils 12 and 14, and the amplifier connections from the set 29 to the loud speaker 31 are closed. A message coming in and affecting the diaphragm 10 is thus amplified and re-produced at the loud speaker 31 with sufficient loudness to be heard easily several feet away from the telephone housing.

The main circuit and the connections to the wires 12 and 14 will be of the usual type and are well known in this art. The telephone will therefore operate in the usual way whenever the bell rings and the operator of the set needs only to pull out the bar 18 to close the circuits and make the set ready for use.

Of course, the bar 18 could be mounted in other parts of the housing and the panel 7 could likewise be shifted and disposed at a side or the front of the housing, if desired. Also, the amplifier might be placed elsewhere, but the connections and general combination would still be the same throughout.

FIGURES 8, 9 and 10 illustrate how the above-described equipment can be modified to include the ordinary removable handpiece of a telephone set, in addition to the transmitting and sending diaphragms within the housing 1. At the top of the housing are the usual studs or projections 35 between which is disposed the hand member 36, having receiving and sending portions at its ends. When this member 36 is in place, the studs 20 are depressed. When a call comes in, the user, if his hands are occupied, can take the call and answer it without removing the member 36, depending entirely on the receiving and transmitting apparatus inside the housing 1. If, however, he wants to listen and speak privately, the handpiece 36 is lifted and held to the ear and mouth. The studs 20 are then lifted by the well known springs, not shown, in the housing, and a switch, not shown, but also well known, is then freed to connect the wiring in the member 36 in circuit with the line outside.

The panel 7a in this form, which bears the projections 8 and 15, each carrying a separate magnetic core with coils thereon and supporting a diaphragm adjacent the magnets, as above-described, is provided with a shelf 37 on which the amplifying apparatus 29 for the loud speaker 31 is mounted in the housing 1. The panel 7a and shelf 37 are of insulating material and bear contact terminals so that when the user does not want to use the member 36, he can leave this member resting on the studs 20, and then the circuit to the mouthpiece and ear piece in the member 36 remain open. To energize the transmitting and receiving means inside the housing 1, however, the stem 18a (FIGURE 10) is pulled out as before by means of one of the knobs 19 at its ends. This stem will be mounted beneath the shelf and carries bridging members 41 and 45, so that when the stem is moved in the right direction, the bridging members 41 are moved to close the circuit across the contacts 42 to the coils 14 and 12, and other bridging member 45 on the stem 18a close the circuit across the terminals 44 to the amplifying unit. But, if the member 36 is to be lifted, the stem remains in such position that the circuits to the amplifier and the coils 14 and 12 are open, and when the member 36 is lifted, the studs 20 of course rise and the circuit is closed through the wires 38 which are connected to the main supply wires 39. These main supply wires have branch wires 40 leading to the terminals 42 for the receiving and sending parts inside the housing 1. The studs 20 and terminals 42 and 46 are of course so located that the upward movement of the studs 20 will bridge these terminals in the same manner as with any telephone set. The showing in FIGURE 10 is merely diagrammatic for the sake of convenience.

FIGURE 10 illustrates diagrammatically the circuits for connecting either the member 36 or the coils 14 and 12 to the outside supply line having the conductors 39. The stem 18a and the terminals which it controls can be so arranged that it can be moved in either direction to establish the circuit to the inside coils for actuating the receiving and transmitting diaphragms indicated at 10 and 16. Further, while an amplifying unit is shown associated with the inside receiving diaphragm, this amplifying circuit may at times be omitted.

The arrangement of the sending and receiving diaphragms 10 and 16 and associated parts inside the housing 1 serves in effect as an extension in combination with the usual removable member or hand set 36; all in one casing so that the user of the telephone can employ it either by lifting the member 36, or speaking and listening from a distance of several feet without an outside connection or accessory separated from the housing 1, but electrically connected thereto.

Having described my invention, what I believe to be new is:

Telephone equipment comprising a housing having at the top depressible studs, the housing also having an opening in its rear wall, a panel secured over said opening, a pair of cores carried by the panel projecting into the housing, a magnetic coil on each core, a diaphragm on each core adjacent each coil, a horn-shaped member in the housing having one end open outside at the front of the housing, the other end being open and adjacent the diaphragm on one of said coils, the housing having an opening in its front beside said member, a loud speaker adjacent the last-named opening, one core having another coil thereon adjacent the diaphragm on said one core, an amplifying unit carried by the housing to be connected to said other coil to operate said loud speaker, the studs being adapted to seat a telephone hand set between them, the weight of said set depressing said studs, a supply circuit connected to said hand set and containing terminals controlled by said studs, a normally open branch circuit connected to the supply circuit and containing conductors leading to said first-named coils, said branch circuit containing terminals, a slidable switch stem mounted to move lengthwise in the housing to bridge the last-named terminals, and close the supply circuit to the first-named coils, the branch circuit containing other terminals to be engaged by said stem and complete a circuit to said other coil and said unit.

References Cited in the file of this patent

UNITED STATES PATENTS

| | | |
|---|---|---|
| 2,402,341 | Patterson | June 18, 1946 |
| 2,639,329 | Ferrier | May 19, 1953 |
| 2,801,287 | Clemency | July 30, 1957 |
| 2,844,659 | Shaw | July 22, 1958 |

FOREIGN PATENTS

| | | |
|---|---|---|
| 256,431 | Great Britain | Aug. 12, 1926 |

OTHER REFERENCES

Telephony, page 21, Feb. 1, 1958.